(12) United States Patent
Carnevali (10) Patent No.: US 7,523,904 B2
(45) Date of Patent: *Apr. 28, 2009

(54) LOCKING RATCHET BASE

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 181 days.

This patent is subject to a terminal disclaimer.

(21) Appl. No.: 10/991,029

(22) Filed: Nov. 16, 2004

(65) Prior Publication Data
US 2006/0102818 A1    May 18, 2006

Related U.S. Application Data

(63) Continuation-in-part of application No. 10/990,896, filed on Nov. 16, 2004, now abandoned.

(51) Int. Cl.
*E04G 3/00* (2006.01)
(52) U.S. Cl. ............ 248/278.1; 248/176.1; 248/292.12; 248/181.1; 403/96
(58) Field of Classification Search ............. 248/183.4, 248/193.3, 292.12, 181.2, 181.1, 278.1, 177.1, 248/178.1, 183.1, 187.1, 514, 515, 276.1; 406/96, 97, 101
See application file for complete search history.

(56) References Cited

U.S. PATENT DOCUMENTS

| | | | | |
|---|---|---|---|---|
| 602,625 A | * | 4/1898 | LaFave | 74/551.4 |
| 1,295,841 A | * | 3/1919 | Benjamin | 403/97 |
| 2,003,844 A | * | 6/1935 | Tintner | 403/97 |
| 4,592,526 A | * | 6/1986 | Kobelt | 248/284.1 |
| 5,367,815 A | * | 11/1994 | Liou | 43/21.2 |
| 5,547,305 A | * | 8/1996 | Treche | 403/97 |
| 5,551,660 A | * | 9/1996 | Leduchowski | 248/276.1 |
| 5,964,439 A | * | 10/1999 | Johnson | 248/278.1 |
| 5,964,443 A | * | 10/1999 | Leveille | 248/478 |
| 6,446,923 B1 | * | 9/2002 | Olkkola | 248/278.1 |
| 6,598,544 B2 | * | 7/2003 | Laws et al. | 108/131 |
| 6,619,872 B2 | * | 9/2003 | Crorey et al. | 403/97 |
| 6,629,801 B2 | * | 10/2003 | Cheng | 403/101 |
| 6,691,965 B1 | * | 2/2004 | Lin | 248/274.1 |
| 6,786,461 B1 | * | 9/2004 | Tsai et al. | 248/118.3 |
| 2004/0089777 A1 | * | 5/2004 | Schilt et al. | 248/227.2 |

* cited by examiner

*Primary Examiner*—Kimberly T Wood
(74) *Attorney, Agent, or Firm*—Charles J. Rupnick, Attorney at Law (57) ABSTRACT

A ratcheting mounting device has a substantially rigid base that is formed with a receptor surface projected above a foot portion that is structured with one or more through holes for securing the base to an external surface such as a floor or wall; a substantially rigid ratcheting coupler that is formed with an insertion surface and an appendage coupler for securing an appendage thereto; a plurality of cooperating radially extended teeth and radially extended sockets arranged between the respective receptor and insertion surfaces of the base and ratcheting coupler for orienting the surface of the ratcheting coupler relative to the surface of the base in different stepwise angular orientations; and a clamping mechanism that is structured for constraining the respective receptor and insertion surfaces of the base and ratcheting coupler in different angular relationships.

23 Claims, 9 Drawing Sheets

LOCKING RATCHET BASE

This application is a Continuation-in-part and claims priority benefit of U.S. patent application Ser. No. 10/990,896 entitled, "LOCKING RATCHET BASE," filed in the name of Jeffrey D. Carnevali on Nov. 16, 2004 now abandoned, the complete disclosure of which is incorporated herein by reference.

FIELD OF THE INVENTION

The present invention relates to a mechanical mounting device, and in particular to a secure ratcheting mounting device for supporting external objects relative to a fixed platform.

BACKGROUND OF THE INVENTION

Universal mounting devices are known for providing a positionable mounting platform in and on different industrial and commercial platforms, including floors, walls, work bench surfaces, and vehicles. These universally positionable mounting platforms are typically structured to support a wide variety of tools and other mobile devices too heavy for conventional mounting devices of the type disclosed in U.S. Pat. No. 5,845,885. However secure such known conventional mounting platforms are, to date these positionable mounting platforms have been known to be limited in load carrying capabilities.

Figure 1:
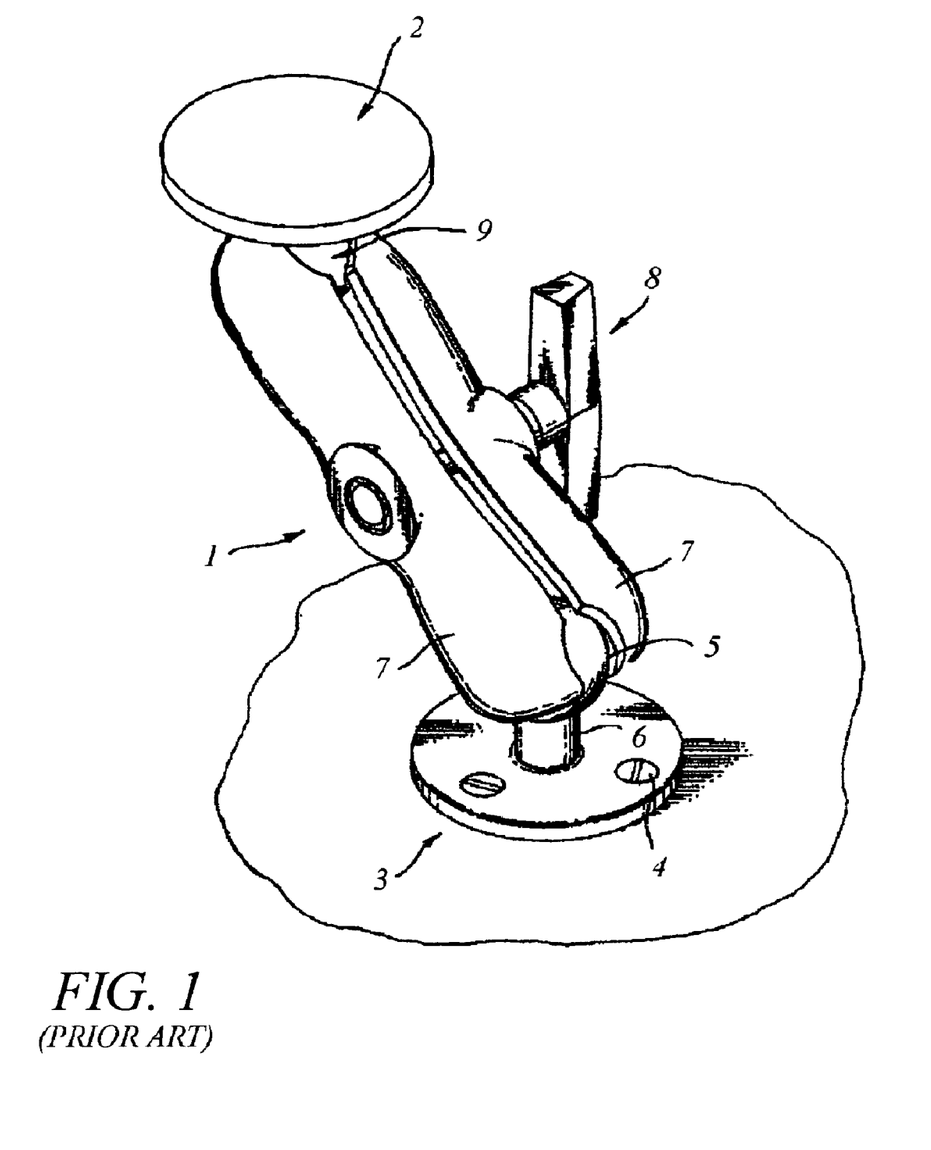
FIG. 1 illustrates one known universal mounting device described in U.S. Pat. No. 5,845,885.

FIG. 1, for example, illustrates one such universal mounting device 1 that provides positionable mounting platform 2. As shown here and described in U.S. Pat. No. 5,845,885, which is incorporated by reference herein in its entirety, universal mounting device 1 is founded on a base 3 that is secured to a fixed surface with a quantity of screws or other fasteners 4. A partial sphere 5 of resiliently compressible material is presented on a post 6 for access by a pair of clamping arms 7 that together form a socket that is positionally secured relative to the partial sphere 5 when a clamping mechanism 8 is tightened. The positionable mounting platform 2 is presented on a second sphere 9 of resiliently compressible material that is captured in a second socket formed at the opposite end of the clamping arms 7 and relatively positionally secured by increased tightening of the clamping mechanism 8. The positionable mounting platform 2 (shown without features) is optionally structured to support any of the above variety of mobile devices or another device or structure of the user's choice.

However, the universally positionable mounting platform shown here and described in U.S. Pat. No. 5,845,885 would have to be of ungainly size to support some very large loads, for example, loads applied at the end of a two or three foot lever arm. Therefore, a novel mechanical mounting device for supporting such extreme loads is desirable.

SUMMARY OF THE INVENTION

The present invention overcomes the manufacturing and load capacity limitations of the prior art by providing a ratcheting mounting device having a substantially rigid base that is formed with a first substantially planar receptor surface projected above a foot portion that is structured with one or more through holes for securing the base to an external surface such as a floor or wall; a substantially rigid ratcheting coupler that is formed with a second substantially planar insertion surface and an appendage secured thereto; a plurality of radially extended angular teeth and cooperating radially extended angular sockets arranged between the respective receptor and insertion surfaces of the base and ratcheting coupler for orienting the surface of the ratcheting coupler relative to the surface of the base in different stepwise angular orientations; and a clamping mechanism that is structured for constraining the respective receptor and insertion surfaces of the base and ratcheting coupler in different angular relationships.

According to one aspect of the invention, the clamping mechanism is structured as a threaded member for compressing the insertion surface of the ratcheting coupler against the receptor surface of the base. Optionally, a compression spring is positioned between the respective receptor and insertion surfaces of the base and ratcheting coupler for biasing the insertion surface of the ratcheting coupler away from the receptor surface of the base.

According to another aspect of the invention, the plurality of cooperating teeth and sockets are spaced at cooperating angular intervals in first and second matching substantially circular patterns. Optionally, the number of teeth is the same or less than as the number of sockets.

According to another aspect of the invention, the foot portion of the base optionally secures the receptor surface in an upright or perpendicular orientation relative to the external surface.

According to another aspect of the invention, an appendage coupler for securing the appendage to the ratcheting coupler includes a cinching mechanism that is structured for cinching the appendage in a parallel arrangement with the insertion surface of the ratcheting coupler.

According to another aspect of the invention, the ratcheting mounting device further includes an elongated extension arm coupled between the insertion surface of the ratcheting coupler for extending the ratcheting coupler from the base. The extension arm having a plurality of the radially extended angular teeth at one end for cooperating with the radially extended angular sockets of the base, and a plurality of the radially extended angular sockets at a second opposite end for cooperating with the radially extended angular teeth of the ratcheting coupler for orienting the ratcheting coupler relative to the base in different stepwise angular orientations at a remote distance therefrom. A pair of the clamping mechanisms are provided for constraining the respective receptor and insertion surfaces of the extension arm to the base and ratcheting coupler, respectively, in different angular relationships.

According to another aspect of the invention including the appendage, a mounting platform is provided at an end of the appendage distal from the ratcheting coupler. Optionally, the mounting platform at the distal end of the appendage is structured as a partial sphere of resiliently compressible material.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 2:
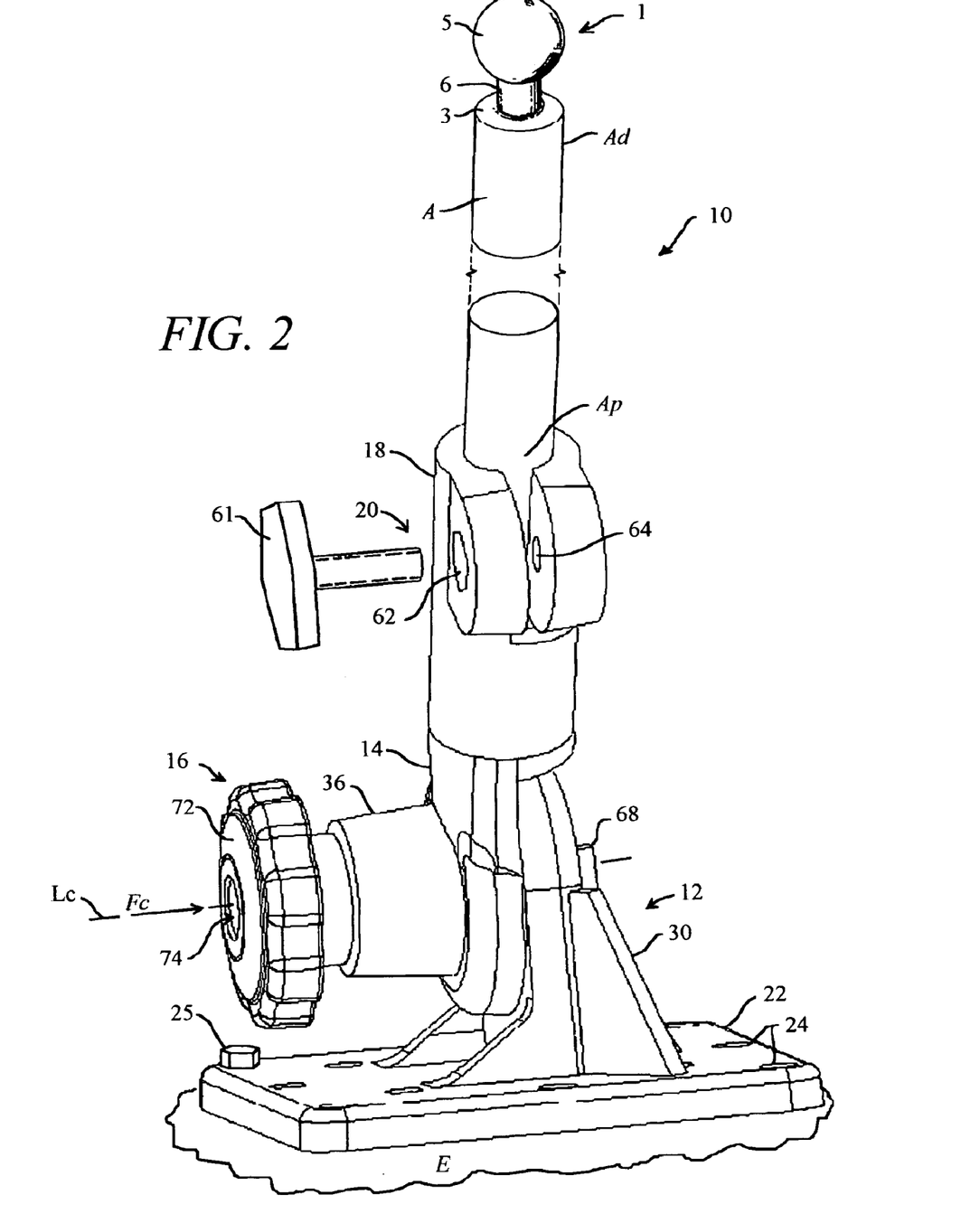
FIG. 2 is a pictorial view that illustrates the present invention by example and without limitation embodied as a ratcheting mounting device.

FIG. 2 is a pictorial view that illustrates the present invention by example and without limitation embodied as a ratcheting mounting device 10 having a base 12 with a ratcheting coupler 14 secured thereto by a coupler clamping mechanism 16. The ratcheting coupler 14 includes an appendage coupler 18 that operates as a means for securing an elongated and substantially cylindrical appendage A in a ratcheting rotational relationship to the base 12. The appendage coupler 18 includes an appendage clamping mechanism 20 for securing the appendage A to the base 12 through the ratcheting coupler 14. A universal mounting device 1 of the type illustrated in FIG. 1 is optionally coupled to an end $A_d$ of the appendage A distal from the ratcheting mounting device 10, while a proximal end $A_P$ of the appendage A is coupled to the ratcheting mounting device 10 through the appendage coupler 18. For example, the distal end $A_d$ of the appendage A operates as the base 3, whereby the post 6 is mounted on the distal end $A_d$ of the appendage A for presenting the partial sphere 5 of resiliently compressible material for access by the pair of clamping arms 7 of the universal mounting device 1, as illustrated in FIG. 1.

Figure 3:
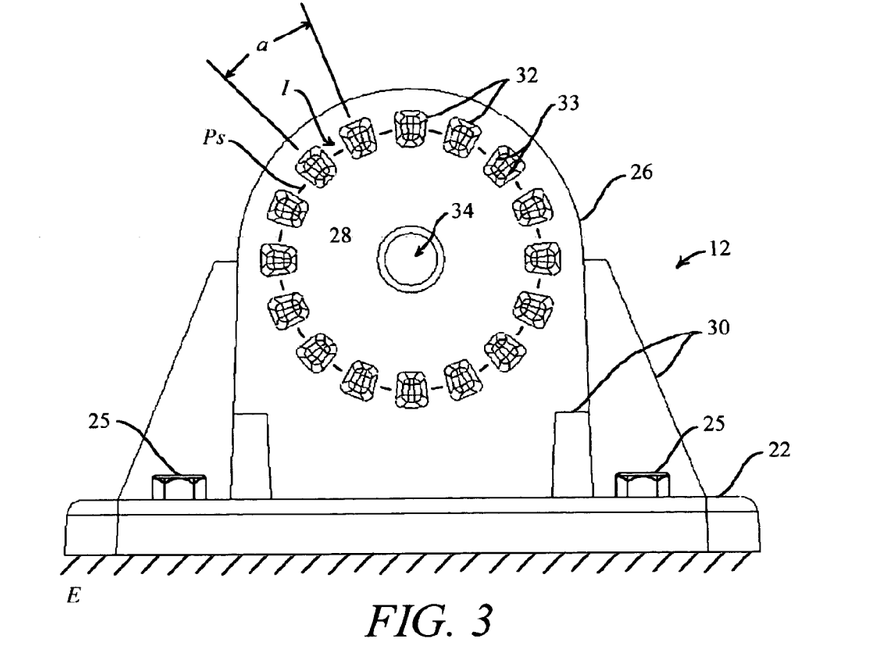
FIG. 3 is an end view of a base portion of the ratcheting mounting device according to one embodiment of the invention.

FIG. 3 is an end view of the base 12 according to one embodiment of the invention. The base 12 is formed of a strong and substantially rigid material, such as metal or rigid plastic, and according to one embodiment of the invention, is formed as an single integral unit, as by conventional machining, forging, casting or injection molding techniques. According to one embodiment of the invention, the base 12 includes a foot 22 structured with multiple apertures 24 (shown in FIGS. 2 and 5) pierced with fasteners 25 that operate as a means for securing the base 12 to a floor, wall or other external surface E for operation of the ratcheting mounting device 10 in for supporting external objects relative to a fixed platform. A female receptor 26 is projected from the foot 22 having a substantially planar upright receptor face 28 that is oriented crosswise to the floor or other external surface E by the foot 22. For example, according to one embodiment of the invention, multiple gussets 30 operate as a means for supporting the receptor 26 relative to the foot 22 with the receptor face 28 oriented in an upright manner crosswise to the external surface E. The receptor 26 includes multiple female sockets 32 recessed relative to the receptor face 28 and substantially uniformly spaced by a selected angle $\alpha$ at regular angular intervals I in a substantially circular pattern $P_S$. According to one embodiment of the invention, the individual female sockets 32 are formed with interior wall surfaces 33 that are angularly inclined inwardly from the receptor face 28 in a truncated inverse pyramidal shape. A substantially cylindrical aperture 34 is formed completely through the receptor 26 at substantially the center of the circular pattern $P_S$ of the recessed sockets 32. The aperture 34 is aligned substantially perpendicular to the receptor face 28. The functions of the recessed sockets 32 and aperture 34 are described herein below.

Figure 4:
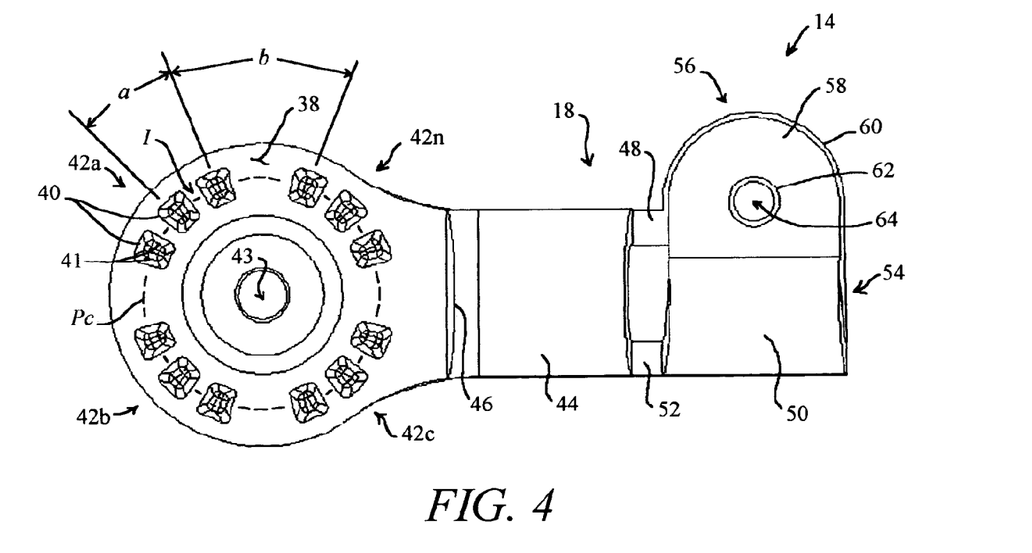
FIG. 4 is an end view of a ratcheting coupler portion of the ratcheting mounting device according to one embodiment of the invention.

FIG. 4 is an end view of the ratcheting coupler 14 according to one embodiment of the invention. The ratcheting coupler 14 is formed of a strong and substantially rigid material, such as metal or rigid plastic, and according to one embodiment of the invention, is formed as an single integral unit, as by conventional machining, forging, casting or injection molding techniques. According to one embodiment of the invention, the ratcheting coupler 14 includes a hub 36 having a substantially planar insertion face 38 which includes multiple male teeth 40 projected therefrom. The multiple male teeth 40 are sized and shaped to be received into and mate with the female sockets 32 in the receptor face 28 of the female receptor 26. According to one embodiment of the invention, when the individual female sockets 32 of the female receptor 26 are formed with interior surfaces 33 that are angularly inclined inwardly from the receptor face 28 in a truncated inverse pyramidal shape, as described herein, the mating male teeth 40 are formed with exterior wall surfaces 41 that are angularly inclined outwardly from the insertion face 38 in a truncated pyramidal shape that is sized to mate with and substantially fill the inverse pyramidal shape of the female sockets 32. The multiple male teeth 40 are arranged in a substantially circular pattern $P_C$ substantially matched to the circular pattern $P_S$ of the recessed sockets 32 in the receptor face 28 of the female receptor 26. The multiple male teeth 40 are optionally substantially uniformly spaced by the same selected angle $\alpha$ as the recessed sockets 32 at the same regular angular intervals I of the recessed sockets 32 about the circular pattern $P_C$ that matches the circular pattern $P_S$ of the recessed sockets 32. Alternatively, as shown, the pattern $P_C$ of teeth 40 is broken at intervals such that the teeth 40 are arranged in multiple clusters 42a, 42b, 42c, through 42n in the circular pattern $P_C$, with each of the clusters 42a through 42n having as few as one or more than one of the male teeth 40. Adjacent clusters 42a, 42b are angularly spaced by an angle $b$ that is an integer multiple of the angle $\alpha$ separating the individual sockets 32, as illustrated in FIG. 3. Alternatively, the individual male teeth 40 are angularly spaced on the circular pattern $P_C$ at the angle $b$ that is a multiple of the angle $\alpha$ separating adjacent female sockets 32 on the receptor face 28.

Accordingly, the male teeth 40 are structured to enter different ones of the female sockets 32 in different angular rotations of the insertion face 38 relative to the receptor face 28 of the base 12. Stated differently, the matching circular arrangements $P_S$ and $P_C$ of female sockets 32 and male teeth 40 are structured such that the male teeth 40 fit into the female sockets 32 at any of many different angularly rotated steps at regular angular intervals I around the face 28 of the receptor 26. As such, the matching circular arrangements $P_S$ and $P_C$ of female sockets 32 and male teeth 40 cooperate to provide a means for orienting the insertion face 38 relative to the receptor face 28 in different prescribed angular orientations in stepwise fashion, wherein the steps between different angularly adjacent orientations is prescribed by the angle α of the intervals I between adjacent female sockets 32 on the receptor face 28.

Radially enlarging the circular patterns $P_S$ and $P_C$ spaces the sockets 32 and teeth 40 from the centers of the circular patterns $P_S$ and $P_C$, which increases the holding strength of the ratcheting mounting device 10 by increasing the lever arm at which the cooperating sockets 32 and teeth 40 operate. Radially enlarging the circular patterns $P_S$ and $P_C$ and spacing the sockets 32 and teeth 40 further from the circular centers also increases the number of intervals I at which the cooperating sockets 32 and teeth 40 can be placed by increasing the linear distance between adjacent angular positions. In other words, the sockets 32 can be positioned closer together without breaking into one another when their circular pattern $P_S$ is larger, and therefore, more of the sockets 32 can be emplaced, and the angle α of the angular intervals I between them made smaller. The size of the matching circular pattern $P_C$ of teeth 40 must also increase to a matching size with the circular pattern $P_S$, but the quantity of cooperating teeth 40 does not have to increase to take advantage of the larger quantity of sockets 32 at narrower angular intervals I for decreasing the proscribed angular intervals α between different angularly adjacent orientations of the insertion face 38 relative to the receptor face 28. Accordingly, the ratcheting coupler 14 can be rotated between the different prescribed angles α relative to the receptor 26 and to the floor or other external surface E through the receptor 26 and foot 22 of the base 12 by moving the teeth 40 to different ones of the sockets 32.

A substantially cylindrical aperture 43 is formed completely through the hub 36 at substantially the center of the circular pattern $P_C$ of the projected male teeth 40. The aperture 43 is aligned substantially perpendicular to the substantially planar insertion face 38. The substantially cylindrical aperture 43 functions in combination with the aperture 34 through the receptor 26 portion of the base 12 for clamping the planar insertion face 38 securely against the receptor face 28 with the male teeth 40 inserted into different ones of the recessed sockets 32 to constrain the ratcheting coupler 14 in a selected angular relationship with the base 12 by means of the coupler clamping mechanism 16, as illustrated in FIG. 2. For example, according to one embodiment of the invention, the cylindrical apertures 34 and 43 are matching clearance holes for a threaded fastener 66 (shown in FIG. 5) that operates as part of the coupler clamping mechanism 16 for clamping the ratcheting coupler 14 to the base 12.

The appendage coupler 18 of the ratcheting coupler 14 operates as a means for securing the appendage A (shown in FIG. 2) in a ratcheting rotational relationship to the base 12 through the male teeth 40 mating into the female sockets 32 in the face 28 of the receptor 26. The appendage coupler 18 extends from the hub 36 at any convenient angle, including substantially perpendicular, as shown. By example and without limitation, according to one embodiment of the invention, the appendage coupler 18 includes an optionally open-ended tubular female sleeve 44 structured to receive the substantially cylindrical appendage A structured as a rod or tube, as illustrated in FIG. 2. The tubular sleeve 44 is bottomed by a seat 46 that operates as a stop for the appendage A. The appendage coupler 18 also includes the appendage clamping mechanism 20 for securing the appendage A. By example and without limitation, according to one embodiment of the invention, the appendage clamping mechanism 20 is a part-tubular extension 48 of the tubular sleeve 44 projected away from the hub 36. A part-tubular cincture 50 extends from a longitudinal edge surface 52 of the part-tubular extension 48 to substantially enclose the tubular space 54 defined by the part-tubular extension 48. A cinching mechanism or clasp 56 is provided as a means for cinching the part-tubular cincture 50 against the part-tubular extension 48 to secure the proximal end $A_P$ of the appendage A within the tubular space 54. For example, a pair of arms 58, 60 operate as the means for cinching the part-tubular cincture 50 against the part-tubular extension 48. The first arm 58 projects from the part-tubular cincture 50 slightly spaced away from the second arm 60 that projects from the part-tubular extension 48 peripheral to the tubular space 54. A fastener 61 (shown in FIG. 2) operates through matching apertures 62, 64 through the respective arms 58, 60 to cinch the arms 58, 60 toward one another across the small space there between. By cinching the arms 58, 60 toward one another, the fastener 61 reduces the inside diameter of the tubular space 54 to secure the proximal end $A_P$ of the cylindrical appendage A. According to one embodiment of the invention, one aperture 62 (or 64) of the first and second matching apertures 62, 64 is a clearance hole sized to pass the fastener 61, and the other aperture 64 (or 62) is an internally threaded aperture sized to threadedly engage the fastener 61. Alternatively, both the first and second matching apertures 62, 64 are structured as clearance holes sized to pass the fastener 61, and the fastener 61 is operated with a threaded nut.

Figure 5:
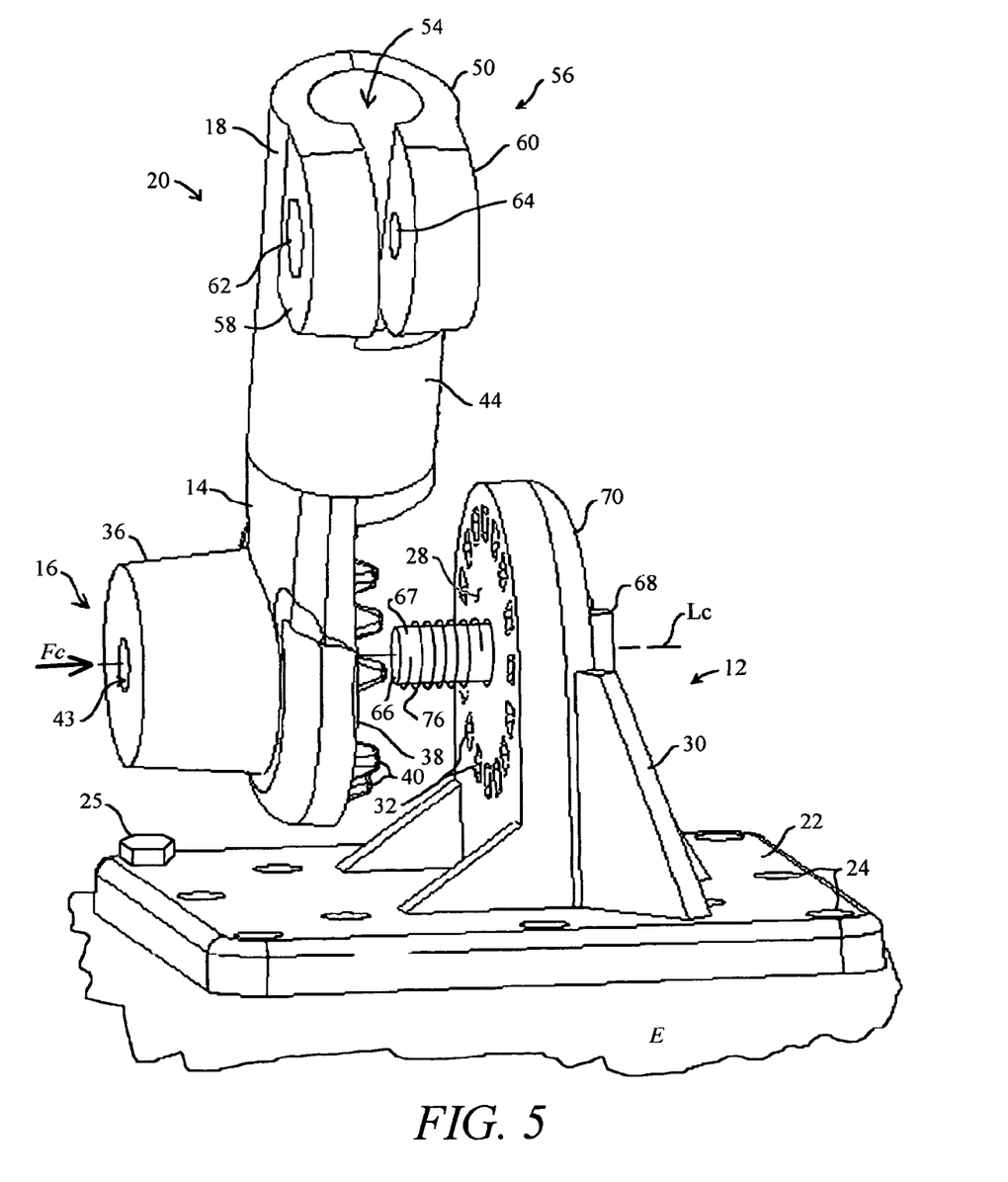
FIG. 5 is an exploded pictorial view of the embodiment of the ratcheting mounting device illustrated in FIG. 2 that illustrates mating of the ratcheting coupler portion with the base portion.

FIG. 5 is an exploded pictorial view of the ratcheting mounting device 10 that illustrates mating of the ratcheting coupler 14 with the base 12. Accordingly, the upright receptor face 28 and insertion face 38 are mutually parallel with one another and oriented substantially perpendicular to a line of contact $L_C$. The multiple female sockets 32 and multiple male teeth 40 are directed opposite to one another along the line of contact $L_C$. As discussed herein, the circular pattern $P_C$ of teeth 40 is matched, i.e., substantially identical, to the circular pattern $P_S$ of the recessed sockets 32. Furthermore, the individual male teeth 40 are structured to be received into and mate snugly with each of the different female sockets 32. Accordingly, when the multiple teeth 40 on the insertion face 38 are introduced into the sockets 32 on the receptor face 28, the ratcheting coupler 14 is angularly fixed relative to the base 12. The coupler clamping mechanism 16 applies an axial load or force $F_C$ along the line of contact $L_C$ that forces the insertion face 38 of the hub 36 against the receptor face 28 of the receptor 26. Because the pyramidal shape of the male teeth 40 matches and substantially fill the inverse pyramidal shape of the female sockets 32, when the male teeth 40 mated with the female sockets 32 under the axial force $F_C$ applied along the line of contact $L_C$, the ratcheting coupler 14 is secured in substantially fixed angular relationship with the receptor 26. Accordingly, the appendage A cannot be rotated relative to the base 12 and the external surface E to which the foot 22 of the base 12 is attached, without either breaking all the teeth 40 from the insertion face 38, or separating the ratcheting coupler 14 from the receptor 26. The first is next to impossible because the base 12 and ratcheting coupler 14 are both formed of strong and substantially rigid material, such as metal or rigid plastic, and the second is also next to impossible because the base 12 and ratcheting coupler 14 are securely forced together under the load $F_C$ applied by the coupler clamping mechanism 16.

According to one embodiment of the invention, the coupler clamping mechanism 16 includes the threaded fastener 66 for clamping the ratcheting coupler 14 to the base 12. The threaded fastener 66 is, for example, a male threaded member, such as a bolt, stud or rod, that is projected perpendicularly from the insertion face 38 along the line of contact $L_C$. When the threaded fastener 66 is a stud, the aperture 34 through the receptor 26 is a threaded aperture structured to receive and retain the stud-type threaded fastener 66 with a threaded shaft 67 projected from the receptor face 28 along the line of contact $L_C$. Alternatively, the aperture 34 is eliminated, and the threaded shaft portion 67 of the stud-type threaded fastener 66 is projected out of the insertion surface 38, as by being originally formed as an integral part of the receptor 26, or as being welded or otherwise fixed to the insertion surface 38. When the threaded fastener 66 is a bolt, the threaded shaft 67 of the bolt-type threaded fastener 66 is sized to pass through the aperture 34, and the bolt-type threaded fastener 66 includes a head 68 that is oversize relative to the aperture 34 for being constrained thereby on an opposite side 70 of the receptor 26 from the receptor face 28.

The coupler clamping mechanism 16 also includes a knob 72 (shown in FIG. 2) having an internally threaded bore 74 structured for threadedly engaging the threaded shaft 67 of the threaded fastener 66. The knob 72 is turnable by hand for operating in combination with the threaded fastener 66 as a means for applying the axial force $F_C$ that forces the insertion face 38 of the hub 36 against the receptor face 28 of the receptor 26 along the line of contact $L_C$. Under the axial force $F_C$ each of the male teeth 40 is unable to move relative to the mating sockets 32, and in-turn the ratcheting coupler 14 is forcibly constrained against angular rotation relative to the receptor 26 and base 12 which is constrained relative to the floor or other external surface E by means of the fasteners 25 through the foot 22, as shown in FIG. 2.

Other means for applying the axial force $F_C$, such as a cam device, are also known and are considered to be equivalent to the coupler clamping mechanism 16 described herein for practicing the invention.

According to one embodiment of the invention, a coil or other compression spring 76 is provided between the ratcheting coupler 14 and the base 12 as a means for biasing the hub 36 away from the receptor 26, and thereby separating the insertion face 38 from the receptor face 28 and retrieving the teeth 40 from the sockets 32 when the coupler clamping mechanism 16 is operated in reverse to remove the axial force $F_C$. When the compression spring 76 is provided as a coil or other tubular spring device, it is optionally sized to fit over the shaft 67 of the threaded fastener 66 as a means for retaining the spring 76 within the assembly of the ratcheting mounting device 10 during manual rotation and reorientation of the ratcheting coupler 14 relative to the base 12.

Accordingly, the ratcheting mounting device 10 of the invention effectively supports remote external objects relative to a fixed platform at a significant distance from the fixed platform.

According to different embodiments of the invention, the base 12, ratcheting coupler 14, coupler clamping mechanism 16, and appendage coupler 18 are embodied with different structure to perform the same function to achieve the same result in substantially the same way. For example, the hub 36 portion of the ratcheting coupler 14 is formed with the receptor face 28 with the sockets 32 formed therein, and the receptor 26 portion of the base 12 is formed with the insertion face 38 which includes multiple male teeth 40 projected therefrom. In another example, the sockets 32 and teeth 40 are formed as cooperating truncated conical structures. According to another example, coupler clamping mechanism 16 is a cam mechanism having the knob 72 structured to operate in concert with the shaft 67 for applying the axial force $F_C$ that compresses the insertion face 38 of the hub 36 against the receptor face 28 of the receptor 26 along the line of contact $L_C$. In still another example, the cinching mechanism 56 is replaced with a conventional set screw in a threaded aperture aligned with the tubular space 54. Alternatively, the appendage coupler 18 is formed as a plate having a plurality of apertures for mounting the appendage A thereto by means of fasteners operating through the apertures.

Accordingly, while the preferred embodiment of the invention has been illustrated and described, it will be appreciated that various changes can be made therein without departing from the spirit and scope of the invention.

Additional Embodiments

Figure 6:
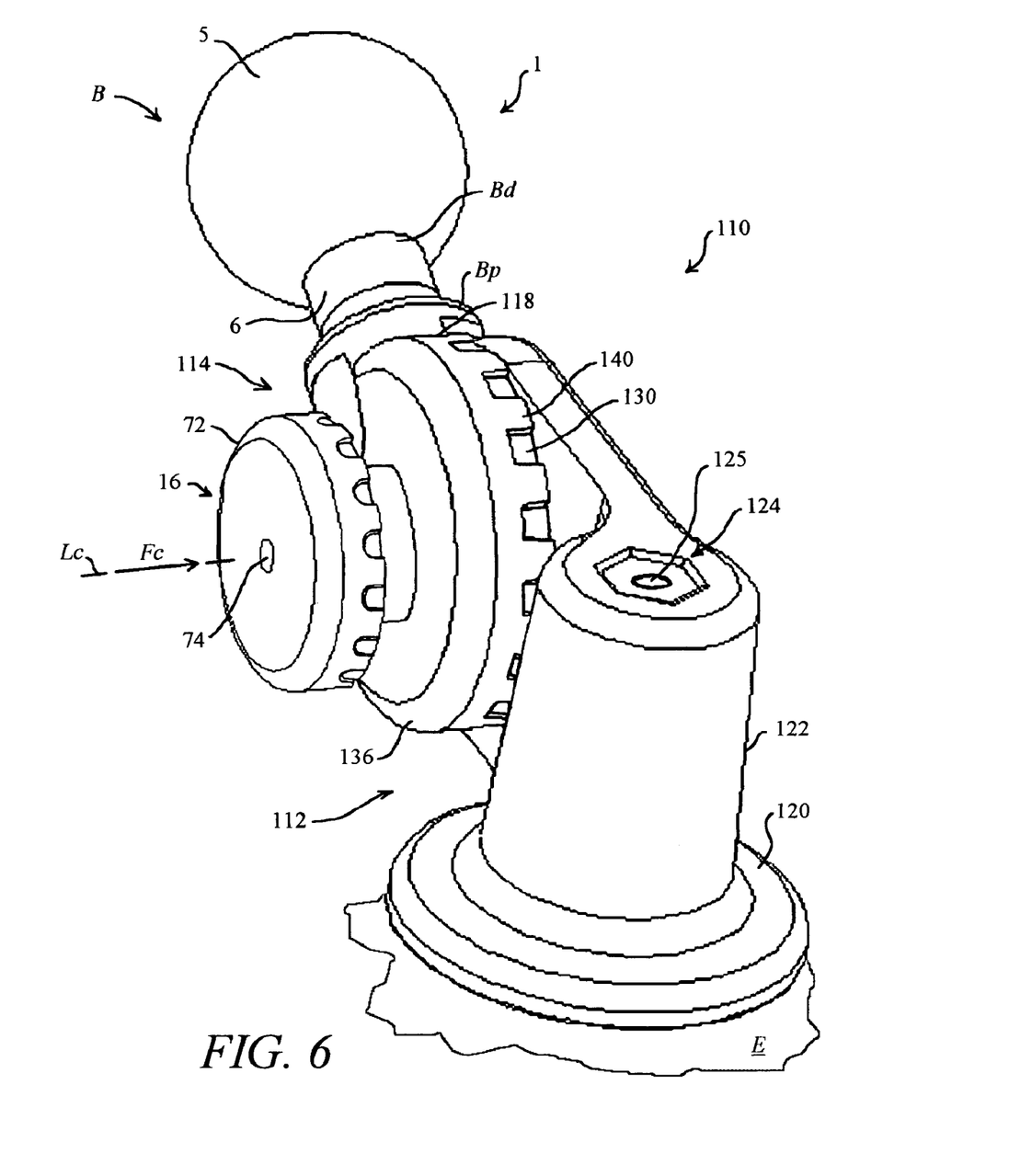
FIG. 6 is a pictorial view that illustrates the present invention by example and without limitation embodied as an alternative ratcheting mounting device.

FIG. 6 is a pictorial view that illustrates the present invention by example and without limitation embodied as an alternative ratcheting mounting device 110 having a base 112 with a ratcheting coupler 114 secured thereto by the coupler clamping mechanism 16 described herein. The ratcheting coupler 14 optionally includes the appendage coupler 18 as described herein that operates as a means for securing an elongated and substantially cylindrical appendage A of the type illustrated in FIG. 2 in a ratcheting rotational relationship to the base 112. When embodied as the appendage coupler 18 illustrated in FIG. 2, the appendage coupler 18 includes the appendage clamping mechanism 20 described herein for securing the appendage A to the base 112 through the ratcheting coupler 114, as also illustrated in FIG. 2. However, according to one alternative embodiment of the present invention, an appendage B is provided that is foreshortened relative to the appendage A illustrated in FIG. 2. A universal mounting device 1 of the type illustrated in FIG. 1 is optionally provided on an end $B_d$ of the foreshortened appendage B distal from the ratcheting mounting device 110, while a proximal end $B_P$ of the appendage B is coupled to the ratcheting mounting device 110 through the appendage coupler 18. According to another alternative embodiment of the present invention, the foreshortened appendage B is integrally formed with the ratcheting coupler 114, as by machining, forging, casting or molding the foreshortened appendage B integrally with the ratcheting coupler 114. The proximal end $B_P$ of the appendage B is thus integral with a peripheral surface 118 of the ratcheting coupler 114, and the appendage B is thus projected out of the peripheral surface 118 illustrated by example and without limitation as a peripheral surface of the ratcheting coupler 114. For example, when the universal mounting device 1 of the type illustrated in FIG. 1 is optionally provided on the distal end $B_d$ of the foreshortened appendage B, the distal end $B_d$ of the appendage B operates as the post 6 for presenting the partial sphere 5 of resiliently compressible material for access by the pair of clamping arms 7 of the universal mounting device 1, as illustrated in FIG. 1.

Figure 7:
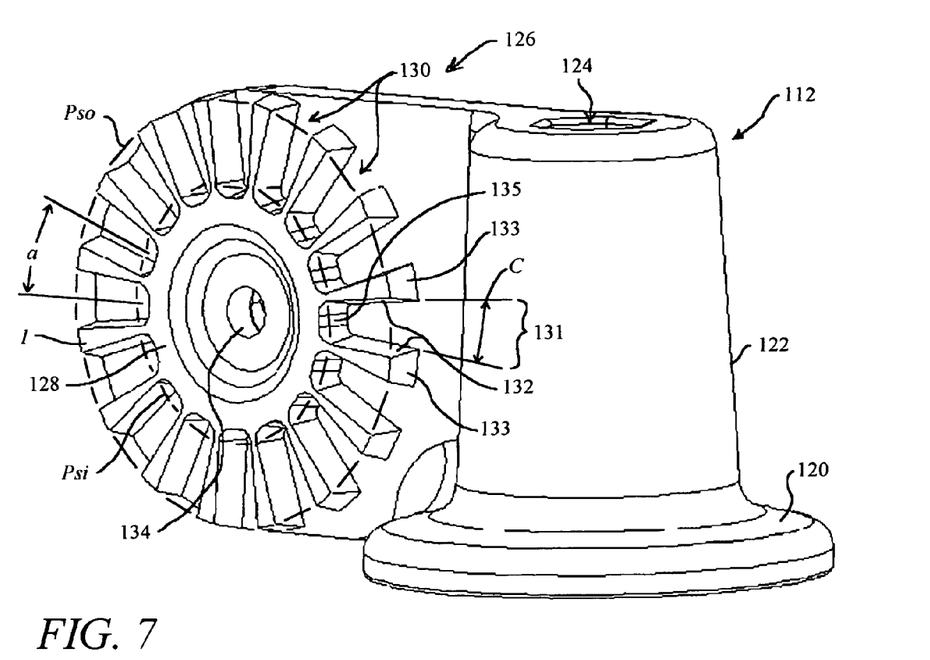
FIG. 7 is an end view of a base portion of the ratcheting mounting device according to one alternative embodiment of the invention.

FIG. 7 is a pictorial view of the base 112 according to one alternative embodiment of the invention. The base 112 is formed of a strong and substantially rigid material, such as metal or rigid plastic, and according to one embodiment of the invention, is formed as an single integral unit, as by conventional machining, forging, casting or injection molding techniques. According to one embodiment of the invention, the base 112 includes a foot 120 structured with a frame 122 projected therefrom. The frame 122 is structured with one or more apertures 124, e.g., a single central aperture 124 shown, each pierced with a fastener 125 (shown in FIGS. 6 and 9) that operate as a means for securing the base 112 to the floor, wall or other external surface E for operation of the ratcheting mounting device 110 in for supporting external objects relative to a fixed platform. A female receptor 126 is projected from the frame 122 having a substantially planar upright receptor face 128 that is oriented in an upright manner crosswise to the floor or other external surface E by the foot 120 and intervening frame 122. The receptor 126 includes multiple female radial sockets 130 recessed relative to the receptor face 128 and substantially uniformly spaced by a selected angle α at regular angular intervals I in a substantially circular pattern having an inner diameter $P_{si}$ and an outer diameter $P_{so}$. The female radial sockets 130 thus resemble spaces between the extended fingers of an open hand. According to one embodiment of the invention, the individual female sockets 130 are formed with interior wall surfaces 132 that are angularly inclined inwardly from the receptor face 128 to form a draft between opposing wall surfaces 132 that together form the individual female sockets 130. The female radial sockets 130 are optionally left with an opening 131 at their outer peripheral ends 133, as illustrated. The radial form of the sockets 130 causes the interior walls 132 to be angled away from one another by an included angle C toward their outer peripheral ends 133. Stated differently, the female radial sockets 130 are more widely spaced at their outer peripheral ends 133 relative to their interior inner ends 135. A substantially cylindrical aperture 134 is formed completely through the receptor 126 at substantially the center of the circular pattern of the recessed radial sockets 130. The aperture 134 is aligned substantially perpendicular to the receptor face 128. The functions of the recessed sockets 130 and aperture 134 are described herein below.

Figure 8:
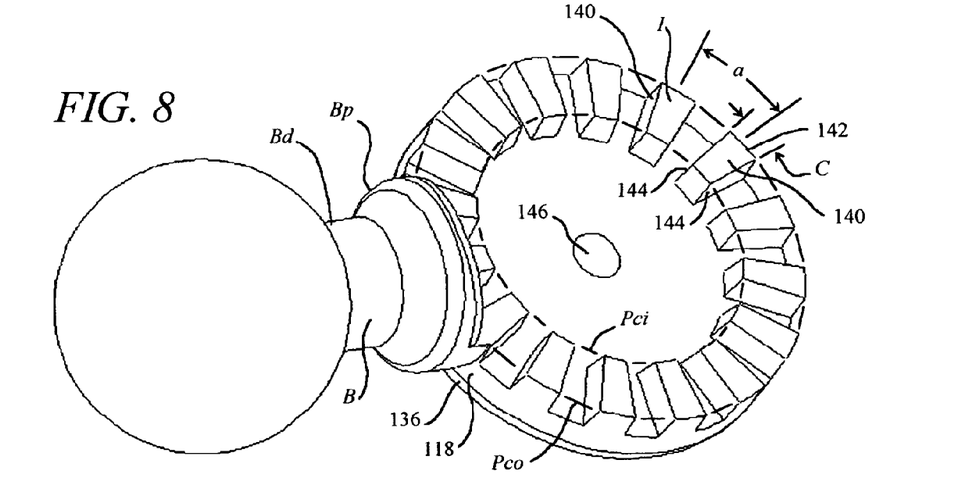
FIG. 8 is an end view of a ratcheting coupler portion of the ratcheting mounting device according to one alternative of the invention.

FIG. 8 is a pictorial view of the ratcheting coupler 114 according to one embodiment of the invention. The ratcheting coupler 114 is formed of a strong and substantially rigid material, such as metal or rigid plastic, and according to one embodiment of the invention, is formed as an single integral unit, as by conventional machining, forging, casting or injection molding techniques. According to one embodiment of the invention, the ratcheting coupler 114 includes a flattened pancake hub 136 having the peripheral surface 118 from which the proximal end $B_P$ of the appendage B is projected. The hub 136 is formed having a substantially planar insertion face 138 which includes multiple male radial teeth 140 projected therefrom. The multiple male teeth 140 are sized and shaped to be received into and mate with the female radial sockets 130 in the receptor face 128 of the female receptor 126. According to one embodiment of the invention, when the individual female sockets 130 of the female receptor 126 are formed with interior surfaces 132 that are angularly inclined inwardly from the receptor face 128 in a draft between opposing wall surfaces 132 with the interior walls 132 being angled away from one another toward their outer peripheral ends 135, as described herein, the mating male teeth 140 are formed with exterior wall surfaces 142 that are angularly inclined outwardly from the insertion face 138 in a radial gear tooth shape that is sized to mate with and substantially fill the draft between the opposing wall surfaces 132 of the female sockets 130. Accordingly, the multiple male teeth 140 are radially extended with the exterior wall surfaces 142 being angled away from one another toward an outer peripheral end 144 of each radial tooth 140 at substantially the same angle C by which the interior walls 132 of the female radial sockets 130 are angled away from one another, as illustrated in FIG. 7. The individual radial teeth 140 are thus sized and shaped to substantially fill a substantial portion of the corresponding female radial sockets 130. The multiple male teeth 140 are arranged in a substantially circular pattern having an inner diameter $P_{ci}$ and an outer diameter $P_{co}$ that are substantially matched to the inner diameter $P_{si}$ and outer diameter $P_{so}$ of the circular pattern of the recessed radial sockets 130 in the receptor face 128 of the female receptor 126. The multiple male teeth 140 are optionally substantially uniformly spaced by the same selected angle a as the recessed radial sockets 130 at the same regular angular intervals I of the recessed radial sockets 130 about the circular pattern that matches the circular pattern of the recessed radial sockets 130. Alternatively, the circular pattern of radial teeth 140 is broken at intervals such that the radial teeth 140 are arranged in multiple clusters similar to the multiple clusters 42a through 42n of in the circular pattern of pyramidal teeth 40 illustrated in FIG. 4, with each of the clusters having as few as one or more than one of the male teeth 140. As with the pyramidal teeth 40, adjacent clusters 42a, 42b are angularly spaced by the angle b that is an integer multiple of the angle α separating the individual sockets 130, as illustrated in FIG. 7. Alternatively, the individual male radial teeth 140 are angularly spaced on the circular pattern at the angle b that is a multiple of the angle α separating adjacent female radial sockets 130 on the receptor face 128.

Accordingly, the male radial teeth 140 are structured to enter different ones of the female radial sockets 130 in different angular rotations of the insertion face 138 relative to the receptor face 128 of the base 112. Stated differently, the matching circular arrangements of female radial sockets 130 and male radial teeth 140 are structured such that the male radial teeth 140 fit into the female radial sockets 130 at any of many different angularly rotated steps at regular angular intervals I around the face 128 of the receptor 126. As such, the matching circular arrangements of female radial sockets 130 and male radial teeth 140 cooperate to provide a means for orienting the insertion face 138 relative to the receptor face 128 in different prescribed angular orientations in stepwise fashion, wherein the steps between different angularly adjacent orientations is prescribed by the angle a of the intervals I between adjacent female radial sockets 130 on the receptor face 128.

Radially enlarging the outer diameters $P_{so}$ and $P_{co\ of\ the\ circular}$ patterns of radial sockets 130 and radial teeth 140 spaces the radial sockets 130 and radial teeth 140 from the centers of the circular patterns, which increases the holding strength of the ratcheting mounting device 110 by increasing the lever arm at which the cooperating radial sockets 130 and radial teeth 140 operate. Radially enlarging the outer diameters $P_{so}$ and $P_{co\ of\ the\ circular}$ patterns and spacing the radial sockets 130 and radial teeth 140 further from the circular centers also increases the number of intervals I at which the cooperating radial sockets 130 and radial teeth 140 can be placed by increasing the linear distance between adjacent angular positions. In other words, the radial sockets 130 can be positioned closer together without breaking into one another when their outer diameters $P_{so}$ and $P_{co}$ are larger, and therefore, more of the radial sockets 130 can be emplaced, and the angle α of the angular intervals I between them made smaller. The size of the matching circular pattern of the radial teeth 140 must also increase to a matching size with the circular pattern of radial sockets 130, but the quantity of cooperating radial teeth 140 does not have to increase to take advantage of the larger quantity of radial sockets 130 at narrower angular intervals I for decreasing the proscribed angular intervals α between different angularly adjacent orientations of the insertion face 138 relative to the receptor face 128. Accordingly, the ratcheting coupler 114 can be rotated between the different prescribed angles α relative to the receptor 126 and to the floor or other external surface E through the receptor 126 and foot 120 of the base 112 by moving the radial teeth 140 to different ones of the radial sockets 130.

A substantially cylindrical aperture 146 is formed completely through the hub 136 at substantially the center of the circular pattern of the projected male radial teeth 140. The aperture 146 is aligned substantially perpendicular to the substantially planar insertion face 138. The substantially cylindrical aperture 146 functions in combination with the aperture 134 through the receptor 126 portion of the base 112 for clamping the planar insertion face 138 securely against the receptor face 128 with the male radial teeth 140 inserted into different ones of the recessed radial sockets 130 to constrain the ratcheting coupler 114 in a selected angular relationship with the base 112 by means of the coupler clamping mechanism 16, as illustrated in FIG. 2. For example, according to one embodiment of the invention, the cylindrical apertures 134 and 146 are matching clearance holes for the threaded fastener 66 (shown in FIG. 9) that operates as part of the coupler clamping mechanism 16 for clamping the ratcheting coupler 114 to the base 112.

The ratcheting coupler 114 operates as a means for securing the appendage B in a ratcheting rotational relationship to the base 112 through the male radial teeth 140 mating into the female radial sockets 130 in the face 128 of the receptor 126, as shown in FIG. 6. The appendage B extends from the peripheral surface 118 of the hub 136 at any convenient angle, including substantially perpendicular, as shown. By example and without limitation, according to one embodiment of the invention, the appendage B is substantially cylindrical in shape being structured as a rod or tube, such as the post 6 as illustrated in FIG. 1.

Figure 9:
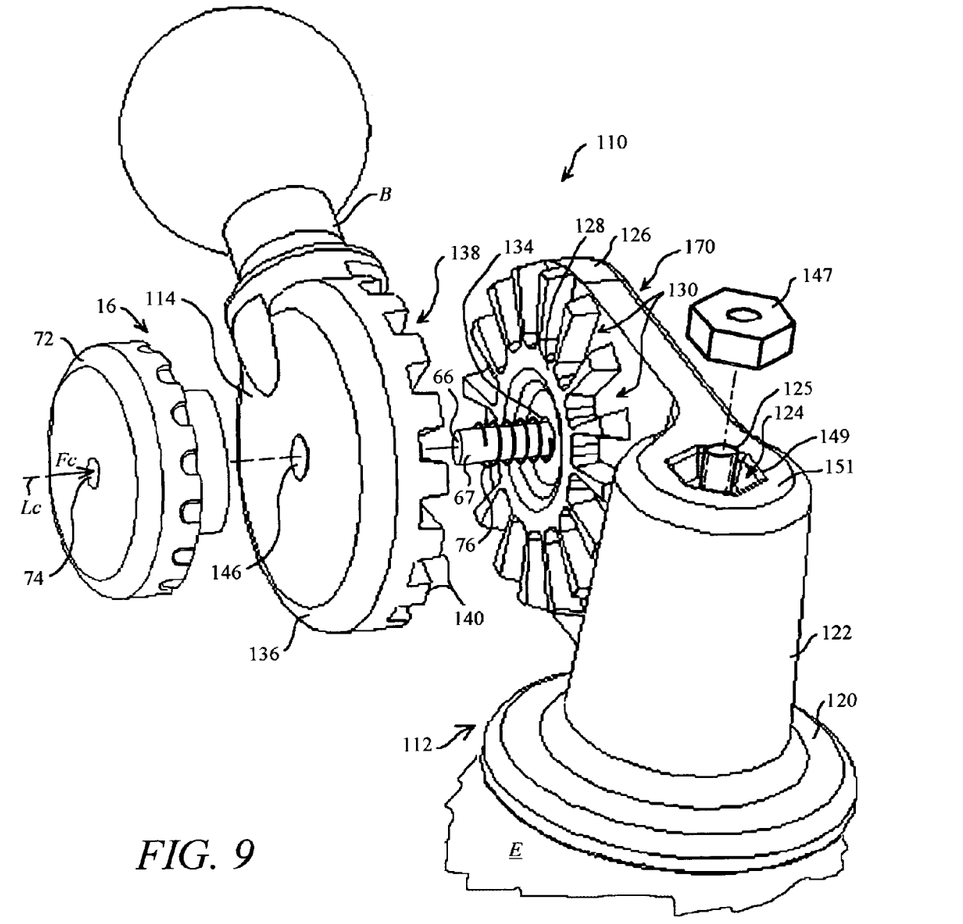
FIG. 9 is an exploded pictorial view of the alternative embodiment of the ratcheting mounting device illustrated in FIG. 6 that illustrates mating of the ratcheting coupler portion with the base portion.

FIG. 9 is an exploded pictorial view of the ratcheting mounting device 110 that illustrates mating of the ratcheting coupler 114 with the base 112. Accordingly, the upright receptor face 128 and insertion face 138 are mutually parallel with one another and oriented substantially perpendicular to the line of contact $L_C$. The multiple female radial sockets 130 and multiple male radial teeth 140 are directed opposite to one another along the line of contact $L_C$. As discussed herein, the circular pattern of radial teeth 140 is matched, i.e., substantially identical, to the circular pattern of the recessed radial sockets 130. Furthermore, the individual male radial teeth 140 are structured to be received into and mate snugly with each of the different female radial sockets 130. Accordingly, when the multiple radial teeth 140 on the insertion face 138 are introduced into the radial sockets 130 on the receptor face 128, the ratcheting coupler 114 is angularly fixed relative to the base 112. The coupler clamping mechanism 16 applies the axial load or force $F_C$ along the line of contact $L_C$ that forces the insertion face 138 of the hub 136 against the receptor face 128 of the receptor 126. Because the radial shape of the male teeth 140 matches and substantially fill the inverse radial shape of the female sockets 130, when the male radial teeth 140 mated with the female radial sockets 130 under the axial force $F_C$ applied along the line of contact $L_C$, the ratcheting coupler 114 is secured in substantially fixed angular relationship with the receptor 126. Accordingly, the appendage B cannot be rotated relative to the base 112 and the external surface E to which the foot 120 and intervening frame 122 of the base 112 are attached, without either breaking all the radial teeth 140 from the insertion face 138, or separating the ratcheting coupler 114 from the receptor 126. The first is next to impossible because the base 112 and ratcheting coupler 114 are both formed of strong and substantially rigid material, such as metal or rigid plastic, and the second is also next to impossible because the base 112 and ratcheting coupler 114 are securely forced together under the load $F_C$ applied by the coupler clamping mechanism 16.

According to one embodiment of the invention, the coupler clamping mechanism 16 includes the threaded fastener 66 for clamping the ratcheting coupler 114 to the base 112. The threaded fastener 66 is, for example, a male threaded member, such as a bolt, stud or rod, that is projected perpendicularly from the insertion face 138 along the line of contact $L_C$. When the threaded fastener 66 is a stud, the aperture 134 through the receptor 126 is a threaded aperture structured to receive and retain the stud-type threaded fastener 66 with its threaded shaft 67 projected from the receptor face 128 along the line of contact $L_C$. Alternatively, the aperture 134 is eliminated, and the threaded shaft portion 67 of the stud-type threaded fastener 66 is projected out of the insertion surface 138, as by being originally formed as an integral part of the receptor 126, or as being welded or otherwise fixed to the insertion surface 138. When the threaded fastener 66 is a bolt, the threaded shaft 67 of the bolt-type threaded fastener 66 is sized to pass through the aperture 134, and the head 68 (shown in FIGS. 2 and 5) that is oversize relative to the aperture 134 for being constrained thereby on an opposite side 170 of the receptor 126 from the receptor face 128.

The coupler clamping mechanism 16 also includes the knob 72 formed with the internally threaded bore 74 that is structured for threadedly engaging the threaded shaft 67 of the threaded fastener 66. As described herein, the knob 72 is turnable by hand for operating in combination with the threaded fastener 66 as a means for applying the axial force $F_C$ that forces the insertion face 138 of the hub 136 against the receptor face 128 of the receptor 126 along the line of contact $L_C$. Under the axial force $F_C$ each of the male radial teeth 140 is unable to move relative to the mating radial sockets 130, and in-turn the ratcheting coupler 114 is forcibly constrained against angular rotation relative to the receptor 126 and base 112 which is constrained relative to the floor or other external surface E by means of the one or more fasteners 25 through the frame 122 and foot 120, as shown in FIG. 6.

As discussed herein, other means for applying the axial force $F_C$, such as a cam device, are also known and are considered to be equivalent to the coupler clamping mechanism 16 described herein for practicing the invention.

According to one embodiment of the invention, the coil or other compression spring 76 is provided between the ratcheting coupler 114 and the base 112 as a means for biasing the hub 136 away from the receptor 126, and thereby separating the insertion face 138 from the receptor face 128 and retrieving the teeth 140 from the sockets 130 when the coupler clamping mechanism 16 is operated in reverse to remove the axial force $F_C$. When the compression spring 76 is provided as a coil or other tubular spring device, it is optionally sized to fit over the shaft 67 of the threaded fastener 66 as a means for retaining the spring 76 within the assembly of the ratcheting mounting device 110 during manual rotation and reorientation of the ratcheting coupler 114 relative to the base 112.

Accordingly, the ratcheting mounting device 110 of the invention effectively supports remote external objects relative to a fixed platform at a significant distance from the fixed platform. By example and without limitation the fastener 125 is a threaded shaft secured to the floor, wall or other external surface E and projected substantially perpendicular thereto. The fastener 125 is an externally threaded fastener or bolt or stud of a length and diameter to pass through the aperture 124 and be engaged by an internally threaded fastener or nut 147 such as a hex nut (shown) that is sized to be engaged within a recess 149 formed in an end surface 151 of the base frame 122. By example and without limitation the recess 149 and nut 147 are of cooperating hex shapes, but are optionally formed with star, square or other appropriate cooperating shapes to constrain the nut 147 against turning relative to the fastener 125.

According to different embodiments of the invention, the base 112, ratcheting coupler 114, coupler clamping mechanism 16, and appendage B or appendage coupler 18 if present are embodied with different structure to perform the same function to achieve the same result in substantially the same way. For example, the hub 136 portion of the ratcheting coupler 114 is formed with the receptor face 128 with the radial sockets 130 formed therein, and the receptor 126 portion of the base 112 is formed with the insertion face 138 which includes multiple male radial teeth 140 projected therefrom. In another example, the radial sockets 130 and radial teeth 140 are formed as a series of the cooperating truncated pyramidal socket 32 and tooth 40 structures extended radially along the respective receptor and insertion faces 128, 138. According to another example, coupler clamping mechanism 16 is a cam mechanism having the knob 72 structured to operate in concert with the shaft 67 for applying the axial force $F_C$ that compresses the insertion face 138 of the hub 136 against the receptor face 128 of the receptor 126 along the line of contact $L_C$.

Accordingly, while the preferred embodiment of the invention has been illustrated and described, it will be appreciated that various changes can be made therein without departing from the spirit and scope of the invention.

Figure 10:
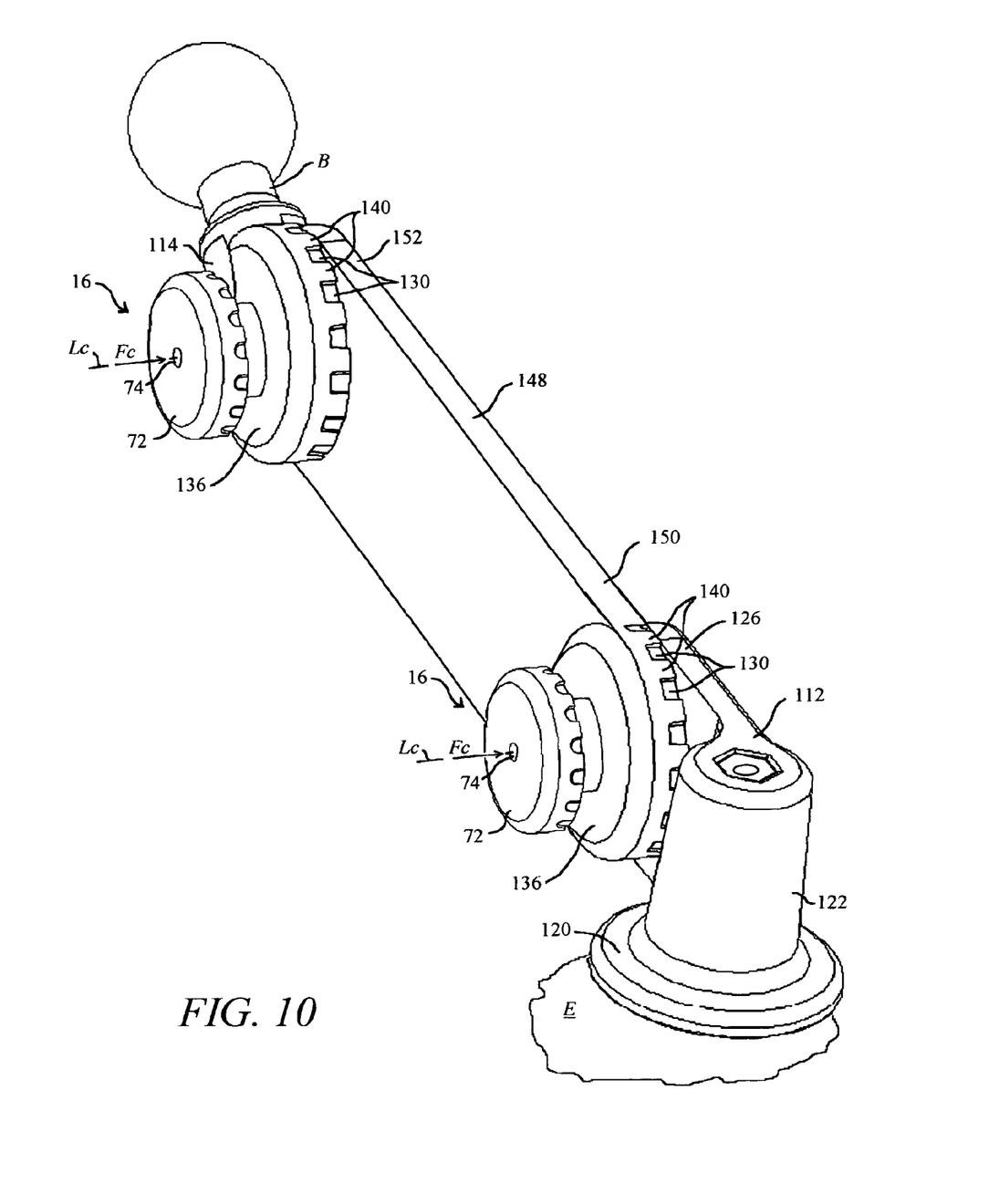
FIG. 10 illustrates yet another alternative embodiment of the ratcheting mounting device of the present invention having an extension arm interposed between the base and ratcheting coupler portions of the ratcheting mounting device.

FIG. 10 illustrates yet another alternative embodiment of the present invention wherein one or more extension arms 148 (one shown) is introduced between the base 112 and ratcheting coupler 114 with one of the coupler clamping mechanisms 16 securing the extension arm 148 to the base 112, and a second one of the coupler clamping mechanisms 16 securing the ratcheting coupler 114 to the extension arm 148. As described herein below, the extension arm 148 is structured at a first end 150 with the substantially planar insertion face 138 which includes the multiple male radial teeth 140 projected therefrom. The extension arm 148 is structured at a second end 152 opposite the first end 150 with the receptor face 128 which includes the multiple female radial sockets 130 recessed relative thereto. The male radial teeth 140 of the first end 150 thus cooperate with the female radial sockets 130 of the frame 122 to provide a means for orienting the first end 150 of the extension arm 148 relative to the receptor face 128 in different prescribed angular orientations in stepwise fashion, wherein the steps between different angularly adjacent orientations is prescribed by the angle α of the intervals I between adjacent female radial sockets 130 on the receptor face 128 of the frame 122 portion of the base 112. The extension arm 148 is thus rotatable in stepwise fashion relative to the base 112. The female radial sockets 130 of the second end 152 cooperate with the male radial teeth 140 of the pancake hub 136 to provide a means for orienting the insertion face 138 relative to the second end 152 of the extension arm 148 in different prescribed angular orientations in stepwise fashion, wherein the steps between different angularly adjacent orientations is prescribed by the angle α of the intervals I between adjacent female radial sockets 130 on the receptor face 128 of the second end 152 of the extension arm 148. The ratcheting coupler 114 is thus rotatable in stepwise fashion relative to the extension arm 148. As such, the ratcheting coupler 114 is rotatable to many different positions and orientations relative to the base 112 and the floor, wall or other external surface E at a remote distance therefrom.

Figures 11, 12:
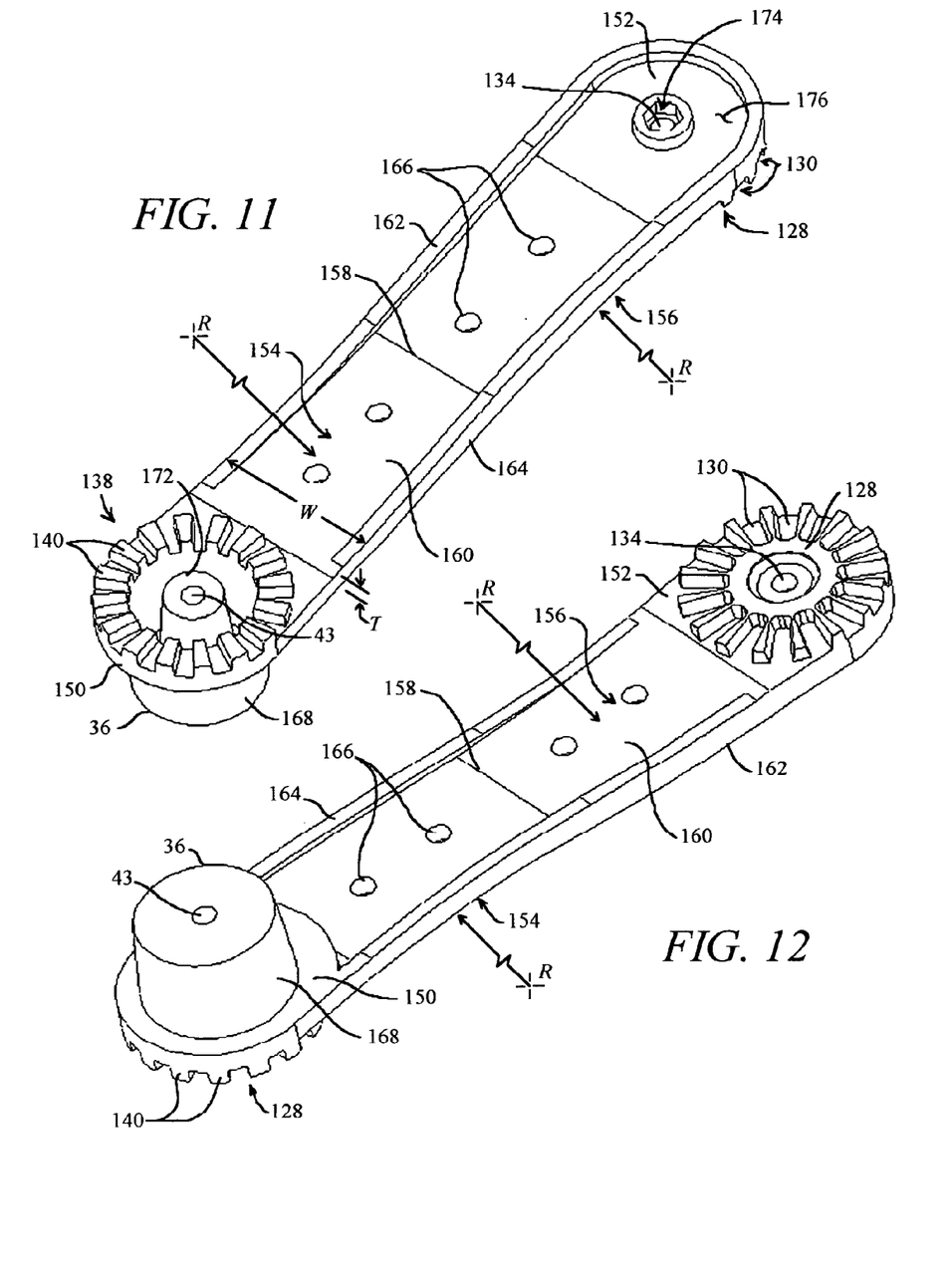
FIGS. 11 and 12 are pictorial views of opposite sides of the extension arm.

FIGS. 11 and 12 are pictorial views of the extension arm 148 from opposite sides. The extension arm 148 of the present invention is formed of a strong and substantially rigid material, such as metal or rigid plastic, and according to one embodiment of the invention, is formed as an single integral unit, as by conventional machining, forging, casting or injection molding techniques. The extension arm 148 is optionally formed having the receptor face 128 at the second end 152 off-set relative to the insertion face 138 at the first end 150. The receptor face 128 is optionally rotated or twisted relative to the insertion face 138.

According to one embodiment of the present invention, the extension arm 148 is optionally formed with a pair of inversely matching curves 154, 156 (shown), matching angles or another means for aligning the receptor face 128 at the second end 152 substantially co-planar with the insertion face 138 at the first end 150. When the extension arm 148 is structured with the inversely matching curves 154, 156, the curves 154, 156 are optionally structured with a substantially identical radius R that is sized to extend from adjacent to the substantially planar receptor and insertion surfaces 128, 138 inwardly to intersect in a smooth transition an approximate center 158 of a frame 160 portion of the extension arm 148 from which the first and second ends 152, 154 extend. The frame 160 is optionally structured as a flat bar having a width W that is large relative to a thickness T of the bar. According to different embodiments of the invention, the fame 160 is embodied with different structure to perform the same function to achieve the same result in substantially the same way. For example, the frame 160 is optionally structured as a substantially straight bar with a pair of inversely matching angles substituted for the inversely matching curves 154, 156 illustrated. In another example, the frame 160 is optionally structured as a substantially cylindrical rod having the first and second ends 150, 152 formed as flattened areas at opposite ends of the cylindrical rod, the rod being structured with either the inversely matching curves 154, 156 or a pair of inversely matching angles as means for aligning the receptor face 128 substantially co-planar with the insertion face 138.

When the frame 160 is structured as an elongated wide flat bar as illustrated, the frame 160 optionally includes gussets 162, 164 that operate as a means for stiffening the elongated bar, whereby the first and second ends 150, 152 remain aligned even under a heavy load mounted on the distal end $B_d$ of the foreshortened appendage B. Optionally, the frame 160 portion of the extension arm 148 may include one or more lightening holes 166 while maintaining its strength and stiffness. The gussets 162, 165 are optionally extended into and around the first and second ends 150, 152 as shown to support and stiffen the insertion and receptor faces 138, 128, respectively.

FIG. 11 illustrates a first side of the extension arm 148 showing the first end 150 of the extension arm 148 having the substantially planar insertion face 138 which includes the multiple male radial teeth 140 projected therefrom. As illustrated in FIG. 10, the first end 150 is optionally formed with the pancake hub 136 illustrated in FIG. 8 having the aperture 146 that cooperates with the coupler clamping mechanism 16 and the aperture 134 through the receptor 126 portion of the base 112 for clamping the planar insertion face 138 securely against the receptor face 128 with the male radial teeth 140 inserted into different ones of the recessed radial sockets 130 to constrain the extension arm 148 in a selected angular relationship with the base 112.

FIG. 11 illustrates the first end 150 of the extension arm 148 being formed alternatively with the bottle-base hub 36 of the type illustrated in FIGS. 2 and 5 having a cup-shaped shell 168 surrounding a central core 172 extending lengthwise inside of the shell 168 with the aperture 43 that cooperates with the coupler clamping mechanism 16 and the aperture 134 through the receptor 126 portion of the base 112 for clamping the planar insertion face 138 of the extension arm 148 securely against the receptor face 128 of the base receptor 126 with the male radial teeth 140 inserted into different ones of the recessed radial sockets 130 to constrain the extension arm 148 in a selected angular relationship with the base 112.

FIG. 11 also illustrates the second end 152 of the extension arm 148 being formed with the substantially planar receptor face 128 which includes the multiple female radial sockets 130 recessed therein for receiving the substantially planar insertion face 138 of the ratcheting coupler 114 and multiple male radial teeth 140 projected therefrom. The second end 152 is formed with the aperture 134 at substantially the center of the circular pattern of the recessed radial sockets 130. The aperture 134 cooperates with the coupler clamping mechanism 16 and the aperture 146 formed through the hub 136 portion of the ratcheting coupler 114 for clamping the planar insertion face 138 of the ratcheting coupler 114 securely against the receptor face 128 of the extension arm 148 with the male radial teeth 140 inserted into different ones of the recessed radial sockets 130 to constrain the ratcheting coupler 114 in a selected angular relationship with the extension arm 148. When the threaded fastener 66 portion of the coupler clamping mechanism 16 is a bolt, the aperture 134 is formed with an appropriately shaped recess 174 on an opposite side 176 of the extension arm 148 from the receptor face 128 to constrain the bolt head 68 against turning when the knob 72 is installed and tightened. According to one embodiment of the present invention, the recess 174 is hex shaped, but is optionally formed with a star, square or other appropriate shape to constrain the threaded fastener 66 against turning relative to the extension arm 148.

FIG. 12 illustrates a second side of the extension arm 148 opposite from the first side and shows the second end 152 of the extension arm 148 having the substantially planar receptor face 128 which includes the multiple female radial sockets 130 recessed therein. The aperture 134 is formed at substantially the center of the circular pattern of the recessed radial sockets 130.

According to different embodiments of the present invention, multiple extension arms 148 are optionally interconnected between the base 112 and ratcheting coupler 114 with the coupler clamping mechanism 16 securing the second end 152 of each successive extension arm 148 to the first end 150 of the previous extension arm 148 to form a series of elongated extension arms 148 that are assembled either in a straight line or in one or more different selected angular relationships each with the next. The interconnecting radial teeth 140 and radial sockets 130 insure that the selected angular relationships are maintained under a load applied at the appendage B (or A) of the ratcheting coupler 114.

While the preferred embodiment of the invention has been illustrated and described, it will be appreciated that various changes can be made therein without departing from the spirit and scope of the invention. Therefore, the inventor makes the following claims.

What is claimed is:

1. A ratcheting mounting device, comprising:
a substantially rigid base formed with a first substantially planar surface extended laterally of a substantially columnar post projected above a foot portion and comprising a central aperture extended longitudinally therethrough receiving a fastener for securing the foot of the base to an external surface;
a substantially rigid ratcheting coupler formed with a second substantially planar surface and an appendage projected substantially radially therefrom and terminated in a part spherical mounting platform;
a plurality of cooperating individual radial teeth and individual radial sockets arranged between the substantially planar surfaces of the base and ratcheting coupler for orienting the surface of the ratcheting coupler relative to the surface of the base in different stepwise angular orientations, wherein the individual radial sockets further comprise substantially identical individual pocket-shaped recesses formed into the surrounding planar surface of one of the base and ratcheting coupler, and the individual radial teeth further comprise substantially identical individual projections projected from the surrounding planar surface of a different one of the base and ratcheting coupler and substantially matched in size to the pocket-shaped recesses of the individual radial sockets; and
a clamping mechanism structured for constraining the planar surfaces of the base and ratcheting coupler in different angular relationships.

2. The device of claim 1 wherein the clamping mechanism further comprises a threaded member for compressing the surface of the ratcheting coupler against the surface of the base.

3. The device of claim 2, further comprising a spring positioned for biasing the surface of the ratcheting coupler away from the surface of the base.

4. The device of claim 1 wherein the plurality of cooperating teeth and sockets are further spaced at cooperating angular intervals in first and second matching substantially circular patterns.

5. The device of claim 4 wherein the plurality of teeth is less than the plurality of sockets.

6. The device of claim 5 wherein the plurality of teeth are further arranged in a first substantially circular pattern of a plurality of clusters of one or more teeth with the clusters being angularly spaced apart by a first angle and the teeth being angularly spaced apart by a second angle within each cluster, and the plurality of sockets are further arranged in a second substantially circular pattern and being uniformly angularly spaced apart by the second angle.

7. The device of claim 1 wherein the central aperture extended longitudinally through the post is further oriented substantially perpendicular to a substantially planar mounting surface of the foot portion for securing the first substantially planar surface in an upright orientation relative to the external surface.

8. The device of claim 1 wherein the part spherical mounting platform of the rigid ratcheting coupler further comprises a partial sphere of resiliently compressible material.

9. The device of claim 8 wherein the ratcheting coupler further comprises a substantially monolithic disk having the appendage projected therefrom a rigid post having the part spherical mounting platform formed thereon distal from the disk.

10. The device of claim 1 wherein the appendage further comprises a substantially rigid post having the part spherical mounting platform formed as a partial sphere of resiliently compressible material at an end thereof distal from the ratcheting coupler.

11. A ratcheting mounting device, comprising:
a base comprising a substantially columnar post projected from an enlarged foot portion adjacent to a first end thereof and a first substantially planar circular surface formed on a flange projected laterally thereof, and being further formed with a means for securing a substantially planar surface of the foot portion of the base to an external surface;

a substantially round and flat ratcheting coupler formed with a second substantially planar circular surface, and further comprising a substantially columnar appendage projected radially thereof and terminating in a part spherical mounting platform at an end thereof distal from the ratcheting coupler;

a means for orienting the surface of the ratcheting coupler relative to the surface of the base in different stepwise angular orientations, the orienting means further comprising a plurality of cooperating radially extended sockets and radially extended teeth operating between the surface of the ratcheting coupler and the surface of the base with the sockets being substantially identical individual pocket-shaped recesses formed into the surrounding substantially planar surface of one of the base and ratcheting coupler and uniformly spaced at first angular intervals in a first substantially circular pattern, and the teeth being substantially identical individual projections projected from the surrounding substantially planar surface of a different one of the base and ratcheting coupler and substantially matched in size to the pocket-shaped recesses of the individual radial sockets and spaced at second angular intervals in a second substantially circular pattern that matches the first circular pattern; and a thread means for constraining the ratcheting coupler in a selected angular relationship with the base.

12. The device of claim 11 wherein the means for constraining the ratcheting coupler in a selected angular relationship with the base further comprises a means for compressing the surface of the ratcheting coupler against the surface of the base.

13. The device of claim 12, further comprising a means for biasing the surface of the ratcheting coupler away from the surface of the base.

14. The device of claim 11 wherein the plurality of teeth is less than the plurality of sockets.

15. The device of claim 14 wherein the second angular intervals further comprise multiples of two or more of the first angular intervals.

16. The device of claim 11, further comprising a means for securing the appendage to the ratcheting coupler.

17. The device of claim 16 wherein the means for securing the appendage to the ratcheting coupler further comprises a means for cinching an appendage in a parallel arrangement with the substantially planar surface of the ratcheting coupler.

18. The device of claim 11 wherein the part spherical mounting platform further comprises a partial sphere of resiliently compressible material.

19. A ratcheting mounting device, comprising:

a base, comprising:
a foot that is structured with a substantially planar mounting surface for securing the base to an external surface and comprising a central aperture therethrough,
a substantially columnar post projected above an upper surface of the foot and tapering away therefrom, the post comprising a central aperture extended longitudinally therethrough and substantially aligned with the central aperture through the foot, and further comprising a nut pocket adjacent to an end thereof opposite from the foot,
a flange extended laterally of the post, and
a receptor formed on the flange laterally of the post, the receptor further comprising a substantially planar receptor face formed with a plurality of radially extended sockets being substantially identical individual pockets recessed into and completely surrounded by the substantially planar receptor face and arranged in a first circular pattern at uniform first intervals;

a ratcheting coupler, comprising:
a substantially planar insertion face formed with a plurality of radially extended matching teeth projecting therefrom and arranged in a second circular pattern that is substantially the same as the first circular pattern of sockets and at positions that correspond to one or more of the first intervals, and
an appendage extended from the ratcheting coupler, the appendage further comprising a substantially columnar post extended substantially radially of the ratcheting coupler and terminated in a part spherical mounting platform; and a coupler clamping mechanism structured for securing the ratcheting coupler to the base receptor with the teeth inserted into the sockets thereof.

20. The device of claim 19 wherein the plurality of teeth is less than the plurality of sockets.

21. The device of claim 19 wherein the coupler clamping mechanism is further structured for securing the ratcheting coupler to the base with the teeth inserted into the sockets in different angular orientations of the insertion face relative to the receptor face.

22. The device of claim 19 wherein the coupler clamping mechanism is further structured for applying an axial force along a line of contact that forces the insertion face against the receptor face.

23. The device of claim 20 wherein the plurality of teeth further comprises one or more clusters each having a plurality of the teeth arranged at the first intervals and being angularly spaced at intervals that are a multiple of the first intervals.

* * * * *